(12) United States Patent
Shoda (10) Patent No.: US 6,183,172 B1
(45) Date of Patent: Feb. 6, 2001

(54) STRUCTURE FOR DETACHABLY MOUNTING A HORIZONTAL DRILL HEAD

(75) Inventor: Hiroshi Shoda, Hamamatsu (JP)

(73) Assignee: Shoda Iron Works Co., Ltd. (JP)

( * ) Notice: Under 35 U.S.C. 154(b), the term of this patent shall be extended for 0 days.

(21) Appl. No.: 09/387,815

(22) Filed: Sep. 1, 1999

(51) Int. Cl.⁷ .................................................. B23B 43/00
(52) U.S. Cl. .............................. 408/36; 408/53; 408/124; 409/144; 409/215
(58) Field of Search ................................. 408/35, 42, 36, 408/53, 124; 409/144, 215; 144/93.1, 83

(56) References Cited

U.S. PATENT DOCUMENTS

| | | | |
|---|---|---|---|
| 2,669,162 | * | 2/1954 | Arliss ................................... 409/215 |
| 4,614,468 | * | 9/1986 | Waldrich et al. ..................... 409/215 |
| 4,627,773 | * | 12/1986 | Ehnert .................................. 409/215 |
| 5,025,548 | * | 6/1991 | Justesen .............................. 409/215 |
| 5,494,088 | * | 2/1996 | Susnjara ............................. 408/124 |

\* cited by examiner

*Primary Examiner*—Daniel W. Howell
(74) *Attorney, Agent, or Firm*—Harness, Dickey & Pierce, P.L.C.

(57) ABSTRACT

A structure for detachably mounting a horizontal drill head 5 on a drill head 4 including a driving spindle 10 rotatably driven by a driving means, a head case 2 for holding the driving spindle 10 above a work table 26 on which a work or works "W" are placed, and an advancing/retracting means for moving the driving spindle 10 toward and from the work table 26. The horizontal drill head 5 has a driving shaft 1 that is connected to the driving spindle 10 and horizontal drills 29 which are arranged substantially perpendicular to the axial direction of the driving shaft 1. The horizontal drill head 5 is mounted on the drill head 4 via a guide pin 7 slidable within a bearing 6 that is mounted on a sidewall of the head case 2 along a direction parallel to the advancing/retracting direction of the driving shaft 1.

10 Claims, 6 Drawing Sheets

STRUCTURE FOR DETACHABLY MOUNTING A HORIZONTAL DRILL HEAD

BACKGROUND OF THE INVENTION

1. Field of the Invention

The present invention relates to a structure for detachably mounting a horizontal drill head on a drill head of a machine tool such as a wood working machine.

2. Description of Background Art

In a conventional mounting structure, the detachable horizontal drill head is mounted on the drill head of the machine tool by securing the driving shaft of the horizontal drill head to the spindle of the machine tool as well as by securing the guide pin slidably inserted into the pin bore formed in the head case of the machine tool to the horizontal drill head. That is, the horizontal drill head is secured to the machine tool by the driving shaft and the guide pin slidable in the pin bore formed in the head case of the drill head of the machine tool.

In such a manner, the detachable horizontal drill head can be mounted on the drill head of the machine tool when horizontal drill working is required and the mounted horizontal drill head can be vertically advanced toward and retracted from the work placed on the work table by the vertical actuation of the driving spindle of the machine tool.

However, since the pin bore for slidably receiving the guide pin is formed in the head case of the drill head of the machine tool, it is very expensive to form the pin bore with the required high accuracy of parallelism to the direction of sliding motion of the driving shaft of the horizontal drill head.

Also in the conventional detachable horizontal drill head, since the pin bore is formed in the head case of the drill head, the size of the head case is necessarily increased and thus the overall size of the machine tool is increased.

SUMMARY OF THE INVENTION

It is therefore an object of the present invention to provide a structure for detachably mounting a horizontal drill head on a drill head which eliminates the formation of the pin bore in the head case, reduces the manufacturing cost of the head case, and reduces the size of the machine tool by providing a bearing for supporting the guide pin on the sidewall of the head case.

According to the present invention, there is provided a structure for detachably mounting a horizontal drill head on a drill head including a driving spindle rotatably driven by a driving means, a head case for holding the driving spindle above a work table on which the works "W" are placed, and an advancing/retracting means for moving the driving spindle toward and from the work table. The horizontal drill head has a driving shaft connected to the driving spindle and horizontal drills arranged substantially perpendicular to the axial direction of the driving shaft and is characterized in that the horizontal drill head is mounted on the drill head via a guide pin slidable within a bearing mounted on a sidewall of the head case along a direction parallel to the advancing/retracting direction of the driving shaft.

According to the structure of the present invention, since the guide pin slides in the bearing mounted on the sidewall of the head case, it is possible to eliminate the formation of the pin bore in the head case and thus to reduce the manufacturing cost of the head case as well as to reduce the overall size of the machine tool.

It is preferable that the horizontal drill head includes sets of bevel gears for converting the vertical rotation of the driving shaft to horizontal rotation of the horizontal drills.

According to this structure, since the vertical rotation of the driving spindle can be transmitted to horizontal rotation of the drills via the driving shaft and the bevel gears, it is possible to carry out a horizontal drilling operation with a simple mechanical structure.

It is preferable that the horizontal drill head includes two spindles for transmitting the converted horizontal rotation to the drills, the spindles being connected with each other via friction between the taper-shaped joint surfaces formed at the inward ends of the spindles.

According to this structure, the centering of the spindles can be easily attained.

It is preferable that the bearing is mounted on a seat secured on the sidewall of the head case.

According to this structure, since the bearing is mounted on the sidewall of the head case via the seat, it is possible to correct the parallelism between the driving spindle and the guide pin when the horizontal drill head is mounted on the head case by modifying the surface of the seat.

It is preferable that the bearing is adapted to be mounted on the seat via a bearing holder and a mounting member arranged between the bearing holder and the seat that has a step abutted on the top surface.

According to this structure, it is possible to mount the bearing on the sidewall of the head case easily and accurately merely by making the top surface of the bearing holder to be abutted against the step formed on the mounting member.

It is preferable that the horizontal drill head is mounted on the drill head via a guide pin holder arranged between the horizontal drill head and the guide pin, and has a guide pin receiving bore into which the guide pin can be inserted and an opening formed in a portion of the periphery of the guide pin receiving bore, the guide pin holder further including a closing means for closing the opening to secure the guide pin in the guide pin receiving bore after the guide pin is inserted into the bore.

According to this structure, it is possible to easily and firmly secure the guide pin within the guide pin holder.

It is preferable that the guide pin holder is formed with several slits extending radially from the periphery of the guide pin receiving bore.

According to this structure, it is possible to easily insert the guide pin in the guide pin receiving bore.

It is preferable that the guide pin holder is provided with a distance adjusting means for adjusting the distance between the guide pin and the driving shaft.

According to this structure, it is possible to mount the horizontal drill head on the drill head accurately by adjusting the error in the distance between the guide pin and the driving shaft.

It is preferable that the distance adjusting means comprises fasteners for connecting the guide pin holder and the horizontal drill head, and bores through which the fasteners pass so that the position of the fasteners within the bores can be changed based on the distance between the guide pin and the driving shaft.

According to this structure, it is possible to easily adjust the error in the distance between the guide pin and the driving shaft merely by adjusting the position of the fasteners relative to the bores.

Finally, it is preferable that the head case contains a plurality of driving spindles.

According to this structure, it is possible to increase the freedom of layout of the driving spindle relative to the head case.

DESCRIPTION OF THE PREFERRED EMBODIMENT

A preferred embodiment of the present invention will be described with reference to the accompanying drawings.

Figure 6:
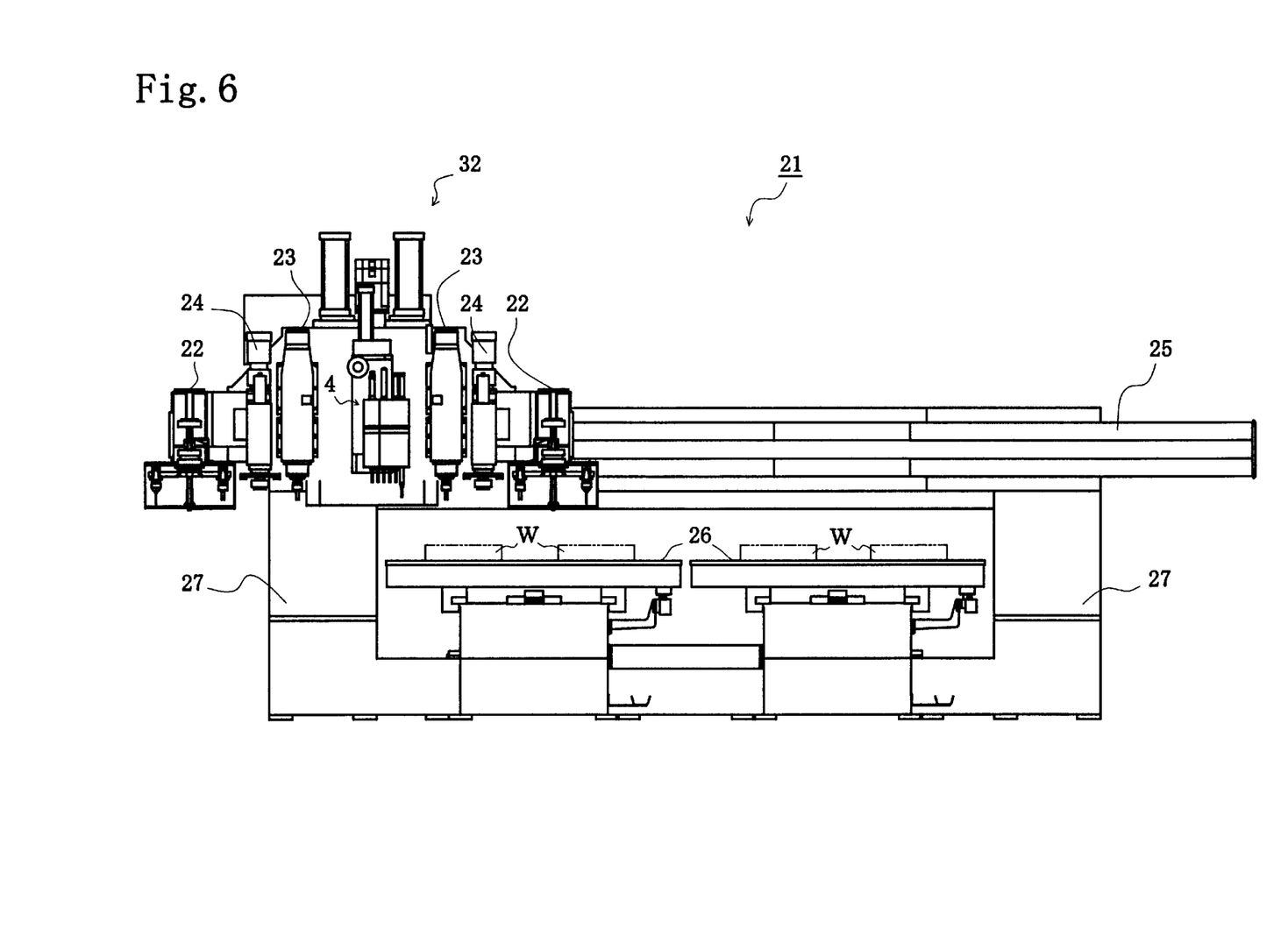
FIG. 6 is a front elevational view of the wood working machine to which the present invention is applied showing a condition in which the horizontal drill head of the present invention is not attached.

A drill head 4 applied to the present preferred embodiment is, for example, mounted on a wood working machine 21 as shown in FIG. 6. The wood working machine 21 has a work table 26 mounted slidably fore and aft on a base frame of the machine on which work or works "W" is placed, a pair of columns 27 mounted on the base frame, horizontal rails 25 extending between and connecting the tops of the columns 27, and a tool gang 32 movable vertically as well as horizontally along the horizontal rails 25.

The tool gang 32 has respectively one pair of router beads 23, ATCs (Automatic Tool Changers) 24 for changing the tools in the router heads 23 and ATC magazines 22 for containing tools to be exchanged by the ATCs 24, and one drill head 4 at the center of the tool gang 32. The work table 26 and the router heads 23 (and the drill head 4) can be moved with respect to each other under numerical control in order to carry out various tasks such as engraving, chamfering, routering, etc. on the wood piece "W" placed on the work table 26.

Figures 7, 8:
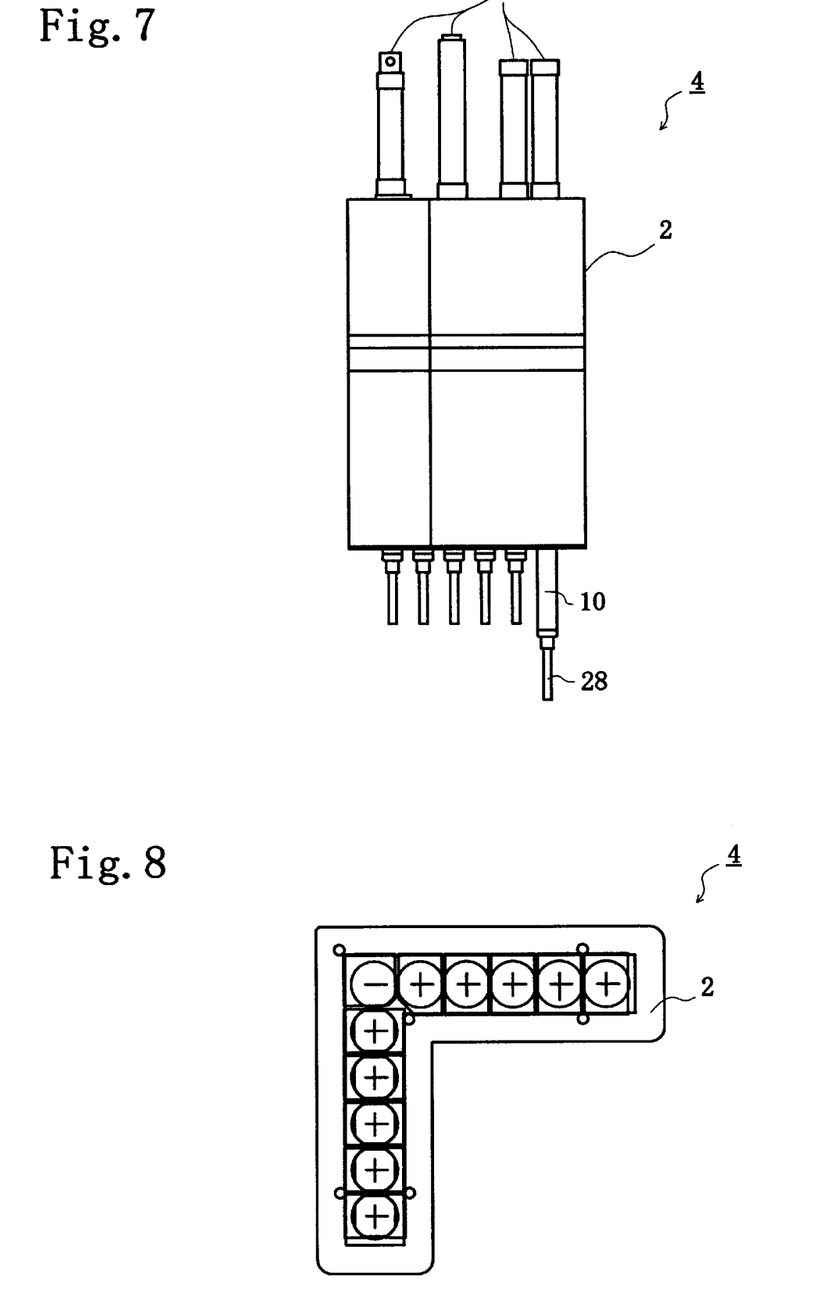
FIG. 7 is a side elevational view of the drill head of the wood working machine showing a condition in which the horizontal drill head of the present invention is not attached.
FIG. 8 is a bottom view of the drill head of the wood working machine showing a condition in which the horizontal drill head of the present invention is not attached.

As shown in FIGS. 7 and 8, the drill head 4 has a head case 2 having a substantially L-shaped configuration, a plurality of driving spindles 10 rotatable at high speed, and pneumatic cylinders 3 for vertically displacing the driving spindles 10. A drill 28 is attached to the bottom end of each driving spindle 10 for working the wood piece "W" on the work table from the vertical direction.

The horizontal drill head 5 (FIG. 1) of the present invention is a detachable horizontal drill head which can be attached to the driving spindle 10 after having removed the drill 28 therefrom and can convert vertical rotation of the driving spindle 10 to horizontal rotation of the horizontal drill 29.

Figure 1:
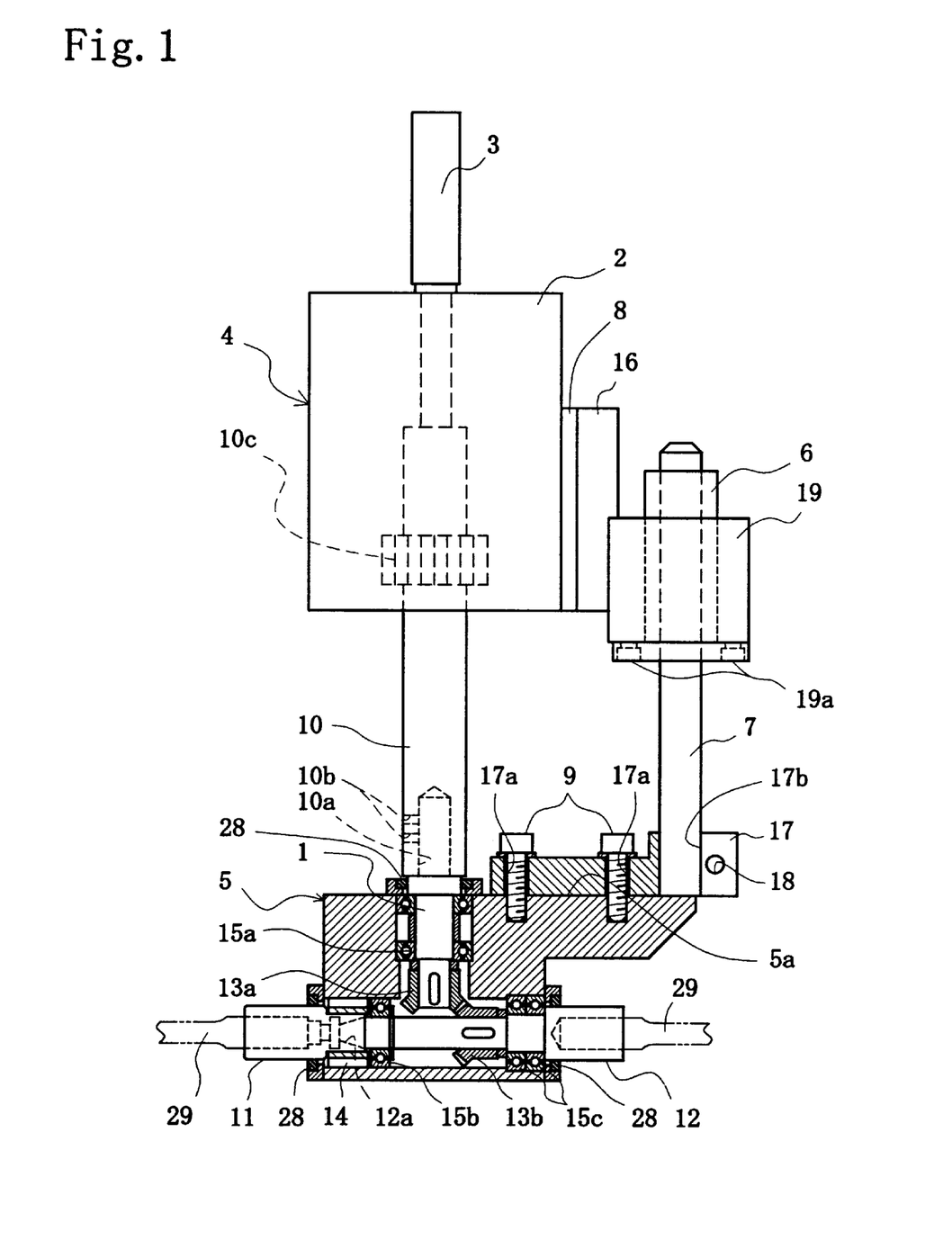
FIG. 1 is a partially sectioned side elevational view of the horizontal drill head of the present invention.
Figure 2:
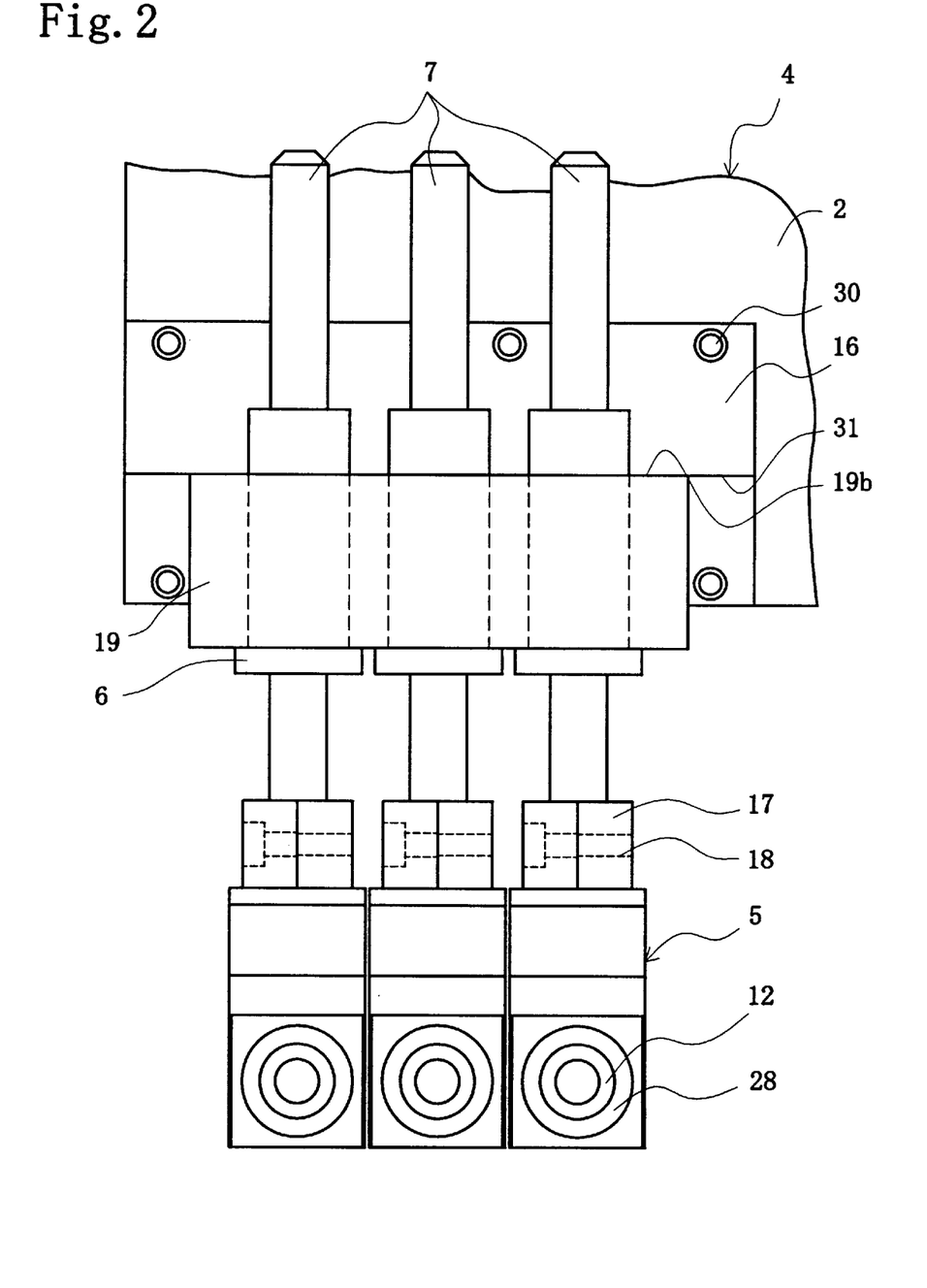
FIG. 2 is a side elevational view of the mounting structure of the horizontal drill head of the present invention.

The structure of the present invention for detachably mounting the horizontal drill head 5 on a drill head 4 is shown in FIGS. 1 and 2. The drill head 4 includes the driving spindles 10, the head case 2, and the pneumatic cylinders 3.

The horizontal drill head 5 has a driving shaft 1 that is attachable to one of the driving spindles 10 which drives the horizontal driven spindles 11, 12 and drills 29, via a pair of bevel gears 13a, 13b that convert the vertical rotation of the driving spindle 10 to the horizontal rotation of the spindles 12. A numeral 28 denotes oil seals.

The driving shaft 1 is connected to one of the driving spindles 10 of the machine tool (e.g., a wood working machine) and is rotatably driven by a driving means for driving the spindles 10. The connection of the driving shaft 1 to the driving spindle 10 is carried out by inserting the shank portion of the driving shaft 1 in a bore 10a formed at the bottom end of the driving spindle 10 and then by securing the shank portion of the driving shaft 1 using set pins (not shown) screwed into bores 10b formed in the driving spindle 10.

The driving spindles 10 are simultaneously driven by the drive means such as an electric motor, each via a gear 10c which enables the driving spindle 10 to be displaced vertically along its longitudinal axis.

The horizontal drill head 5 is rotatably supported by bearings 15a and carries at its bottom end a first bevel gear 13a that mates with a second bevel gear 13b.

Figure 5:
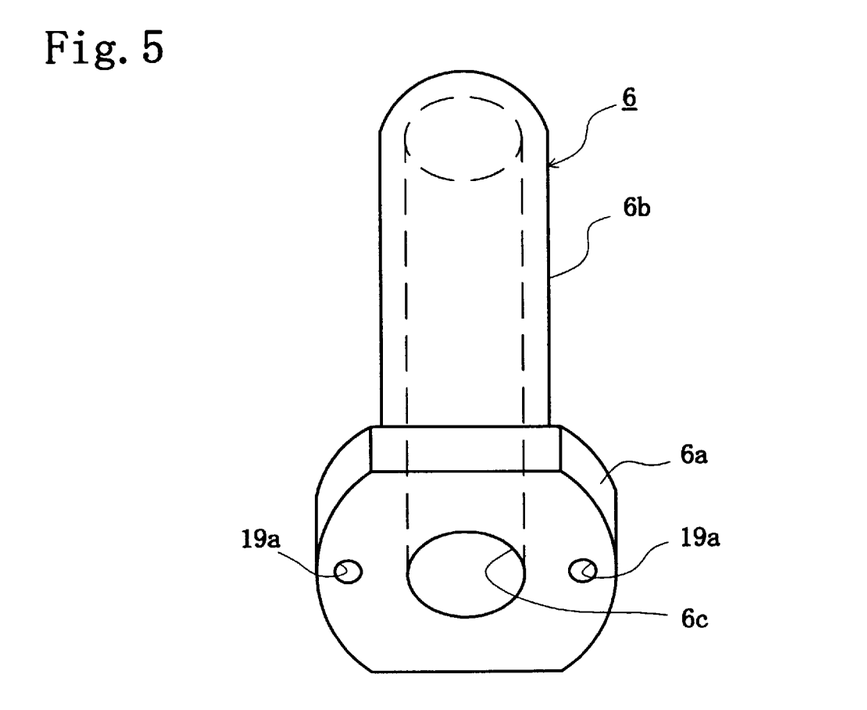
FIG. 5 is a perspective view of the circulating ball type bearing of the horizontal drill head of the present invention.

Bolted on the sidewall of the head case 2 is a seat 8 having a predetermined thickness to which a bearing holder 19 is further bolted via a mounting member 16. The bearing holder 19 holds a bearing 6 for a guide pin 7 and has a flange portion 6a (FIG. 5) and a cylindrical portion 6b in which a through bore 6c is formed for slidably receiving the guide pin 7. The bearing 6 is secured to the bearing holder 19 by bolts which pass through bores 19a formed in the flange portion 6a. The cylindrical portion 6b contains a circulating ball type bearing enabling the guide pin 7 to smoothly slide within the through bore 6c. Bearings other than the circulating ball type bearing may also be used.

Formed on the mounting member 16 is a step 31 (FIG. 2) against which the top surface 19b of the bearing member 19 abuts when the horizontal drill bead 5 is mounted on the machine tool. This facilitates the proper positioning of the bearing holder 19 relative to the mounting member 16.

Any one of the horizontal drill heads 5 may be selectively advanced toward the work table 26 and any other one may also be selectively retracted from the work table 26 in accordance with the working specification applicable to the work "W".

The horizontal drill head 5 contains the driven spindle 11 connected to driven spindle 12 which is secured to the bevel gear 13b that mates with the bevel gear 13a secured on the driving shaft 1.

The spindles 11, 12 are connected with each other via friction between taper-shaped joint surfaces 12a formed at the rear ends of the spindles 11, 12. This enables convenient centering of the spindles 11, 12.

The driven spindle 12 is rotatably supported on two ball bearings 15c and the driven spindle 11 is also rotatably supported on a needle bearing 14 having an inner ring and a ball bearing 15b.

Figure 4:
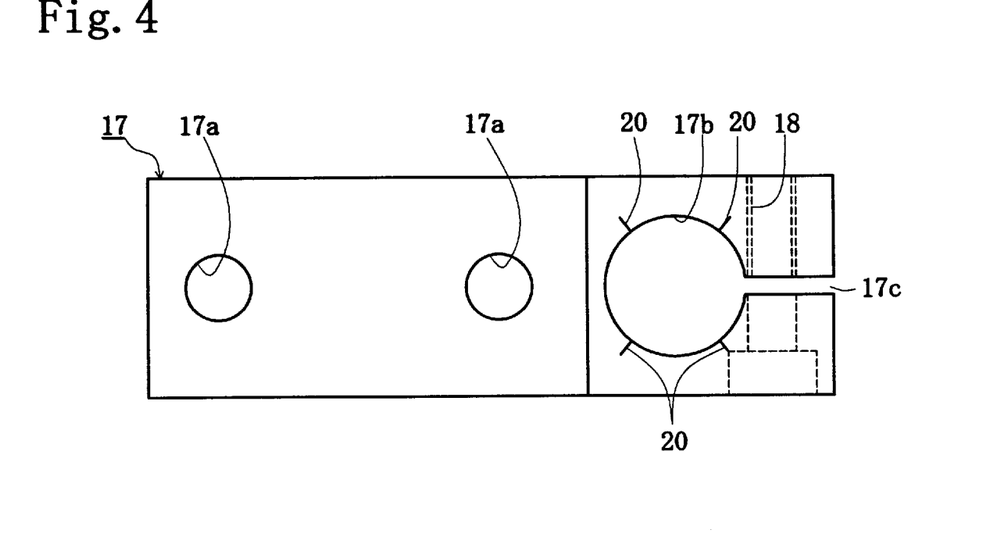
FIG. 4 is a plan view of the guide pin holder of the horizontal drill head of the present invention.

As shown in FIG. 4, the guide pin holder 17 is formed with bores 17a through which the fasteners 9 pass and a guide pin receiving bore 17b into which the guide pin 7 can be inserted. The diameter of the guide pin receiving bore 17b is substantially the same as that of the guide pin 7. An opening 17c is formed in a portion of the periphery of the guide pin receiving bore 17b. The guide pin holder 17 further includes several slits 20 extending radially from the periphery of the guide pin receiving bore 17b. A bolt bore 18 is formed across the opening 17c to form a closing means for closing the opening 17c to fasten the guide pin 7 by the guide pin receiving bore 17b after the guide pin 7 has been inserted into the bore 17b.

Since the diameter of the bolt bore 17a is larger than that of the bolt 9, it is possible to adjust the position of the guide pin holder 17 relative to the horizontal drill head 5 to vary the distance between the guide pin 7 and the driving shaft 1. The bolt bores 17a may be formed to any configuration such as elongated bores.

In the operation of the wood working machine 21 described above, the order of the rotation of the driving spindle 10 by the driving means and of the advancing/ retracting motion thereof by the pneumatic cylinder 3 can be appropriately determined. That is, although it is described that the driving spindle 10 is rotated after the selective advancement thereof, it is possible to advance the driving spindle 10 while it is rotated by the driving means. The simultaneous motion of the rotation and the advancing/ retracting motion of the driving spindle 10 can be attained by providing splines at the connection between the gear 10c and the driving spindle 10.

Figure 3:
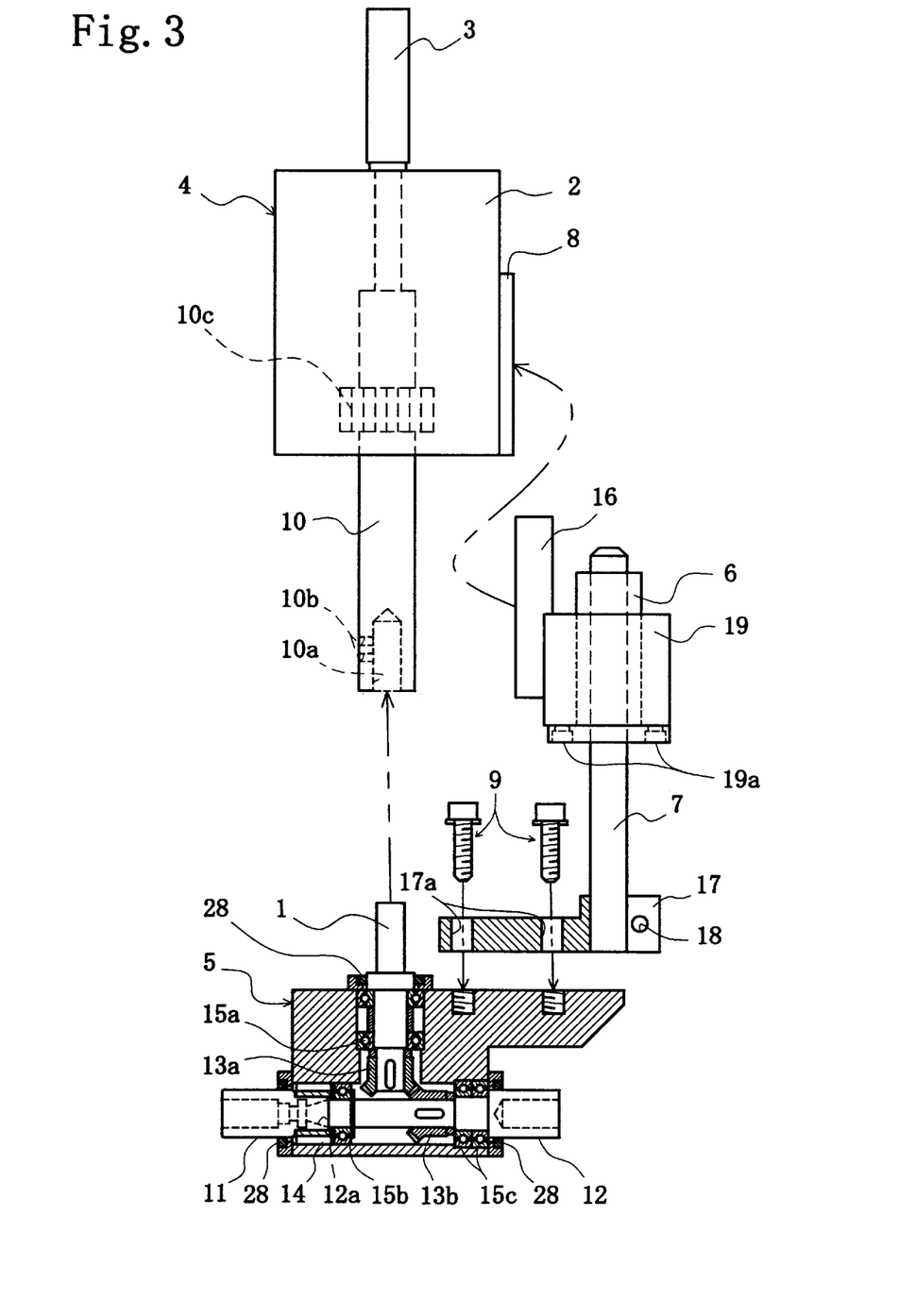
FIG. 3 is an exploded view of the mounting structure of the horizontal drill head of the present invention.

The manner for installation of the horizontal drill head 5 to the drill head 4 will be described with reference to FIG. 3.

First of all, the bearing holder 19 is bolted and secured to the mounting member 16 after having been positioned in abutting relationship to the top surface of the bearing holder 19 against the step 31 of the mounting member 16. Then the mounting member 16 combined with the bearing holder 19 is secured on the seat 8 mounted on the sidewall of the head case 2 with several bolts (not shown). The bottom end of the guide pin 7 is then inserted into the guide pin receiving bore 17b of the guide pin holder 17 and secured therein by tightening the bolt inserted in the bolt bore 18 to close the opening 17c. Note, the presence of the slits 20 facilitates the insertion of the guide pin 7 into the bore 17b.

Then guide pin 7 with its bottom end being held by the bolder 17 is inserted into the bearing 6 and the holder 17 is secured to the horizontal drill head 5 by the bolts 9. The distance between the guide pin 7 and the driving shaft 1 is adjusted by adjusting the positions of the bolts 9 in the bore 17a.

Then the driving shaft 1 is secured to the driving spindle 10 by inserting the shank portion into the spindle bore 10a and inserting the set pins into the bores 10b. Thus, installation of the horizontal drill head 5 to the drill head 4 is completed.

Finally, the operation of the wood working machine 21 installed by the horizontal drill head 5 will be described with reference to FIG. 1 and FIG. 6.

Firstly, the head case 4 is horizontally moved so that it is positioned above the work "W" placed on the work table 26 and then is vertically moved to a position adjacent to the work "W". The selected driving spindle 10 is then moved downward by actuating the corresponding pneumatic cylinder 3, thereby moving the horizontal drill head 5 downward with the aid of the guide pin 7.

The rotation of the driving spindle 10 to which the horizontal drill head 5 is connected is transmitted to the drills 29 via the bevel gears 13a, 13b and driven spindles 11, 12 to horizontally work the wood piece "W".

The driving spindles 10 used for working the wood piece "W" are returned to their original positions after having completed the drilling operation by actuating the pneumatic cylinders 3. Thus, the finished wood piece "W" can be obtained.

According to the present invention, it is possible to easily adjust the error in distance between the guide pin 7 and the driving shaft 1 merely by adjusting the positions of the bolts 9 relative to the bores 17a. In addition, it is possible to easily modify any error in the parallelism between the guide pin 7 and the driving shaft 1, as may be caused after many times of use of the horizontal drill head 5, merely by grinding the surface of the seat 8.

Although the preferred embodiment is described with respect to the wood working machine 21, it should be understood that the present invention can be applied to the other machine tool such as any metal working machine.

What is claimed is:

1. A structure for detachably mounting a horizontal drill head (5) on a drill head (4) including a driving spindle (10) rotatably driven by a driving means, a head case (2) for holding the driving spindle (10) above a work table (26) on which a work "W" is placed, and an advancing/retracting means for moving the driving spindle (10) toward and from the work table (26), the horizontal drill head (5) having a driving shaft (1) connected to the driving spindle (10) and horizontal drills (29) arranged substantially perpendicular to the axial direction of the driving shaft (1) characterized in that the horizontal drill head (5) is mounted on the drill head (4) via a guide pin (7) slidable within a bearing (6) mounted on a sidewall of the head case (2) along a direction parallel to the advancing/retracting direction of the driving shaft (1).

2. A structure of claim 1 wherein the horizontal drill head (5) includes a set of bevel gears (13a, 13b) for converting the vertical rotation of the driving shaft (1) to the horizontal rotation of the horizontal drills (29).

3. A structure of claim 2 wherein the horizontal drill head (5) includes two spindles (11, 12) for transmitting the converted horizontal rotation to the drills (29), the spindles (11, 12) being connected with each other via friction between taper-shaped joint surfaces (12a) formed at inward ends of the spindles (11, 12).

4. A structure of claim 1 wherein the bearing (6) is mounted on a seat (8) secured on the sidewall of the head case (2).

5. A structure of claim 4 wherein the bearing (6) is mounted on the seat (8) via a bearing holder (19), and via a mounting member (16) arranged between the bearing holder (19) and the seat (8), the mounting member having a step (31) adapted to abut the top surface (19b) of the bearing holder.

6. A structure of claim 5 wherein the horizontal drill head (5) is mounted on the drill head via a guide pin holder (17) arranged between the horizontal drill head (5) and the guide pin (7) and having a guide pin receiving bore (17b) into which the guide pin (7) can be inserted and an opening (17c) formed at a portion of the periphery of the guide pin receiving bore (17b), the guide pin holder (17) further including a closing means for closing the opening (17c) to secure the guide pin (7) by the guide pin receiving bore (17b) after the guide pin (7) has been inserted into the bore (17b).

7. A structure of claim 6 wherein the guide pin holder (17) is formed with several slits (20) extending radially from the periphery of the guide pin receiving bore (17b).

8. A structure of claim 6 wherein the guide pin holder (17) is provided with a distance adjusting means for adjusting the distance between the guide pin (7) and the driving shaft (1).

9. A structure of claim 6 wherein the distance adjusting means comprises fasteners (9) for connecting the guide pin holder (17) and the horizontal drill head (5), and bores (17*a*) through which the fasteners (9) pass, the position of the fasteners (9) within the bores (17*a*) being adjustable to vary the distance between the guide pin (7) and the driving shaft (1).

10. A structure of claim 1 wherein the head case (2) contains a plurality of driving spindles (10).

* * * * *

UNITED STATES PATENT AND TRADEMARK OFFICE
CERTIFICATE OF CORRECTION

PATENT NO. : 6,183,172 B1
DATED : February 6, 2001
INVENTOR(S) : Hiroshi Shoda

It is certified that error appears in the above-identified patent and that said Letters Patent is hereby corrected as shown below:

Column 3,
Line 40, "beads" should be -- heads --.

Column 4,
line 39, "bead" should be -- head --.

Column 5,
Line 41, "bolder" should be -- holder --.

Signed and Sealed this

Second Day of October, 2001

*Attest:*

NICHOLAS P. GODICI
*Attesting Officer*    *Acting Director of the United States Patent and Trademark Office*